June 8, 1926.
O. J. WEISS ET AL
DEVICE FOR APPLYING FLEXIBLE PIPE CONNECTIONS
Filed Jan. 19, 1926
1,587,689
2 Sheets-Sheet 1
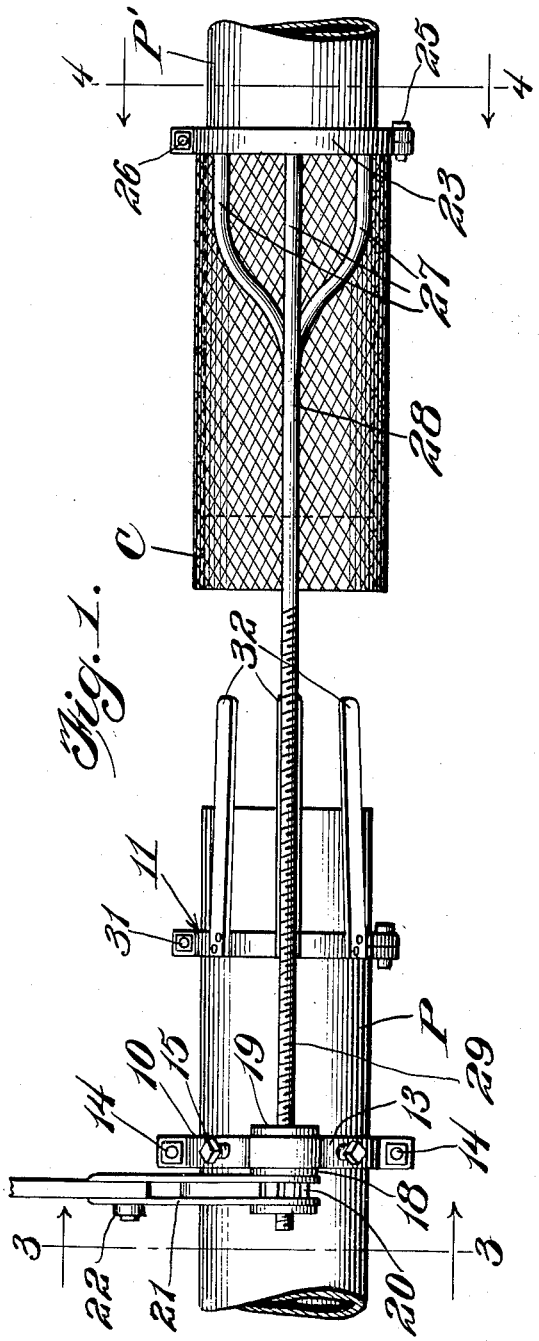
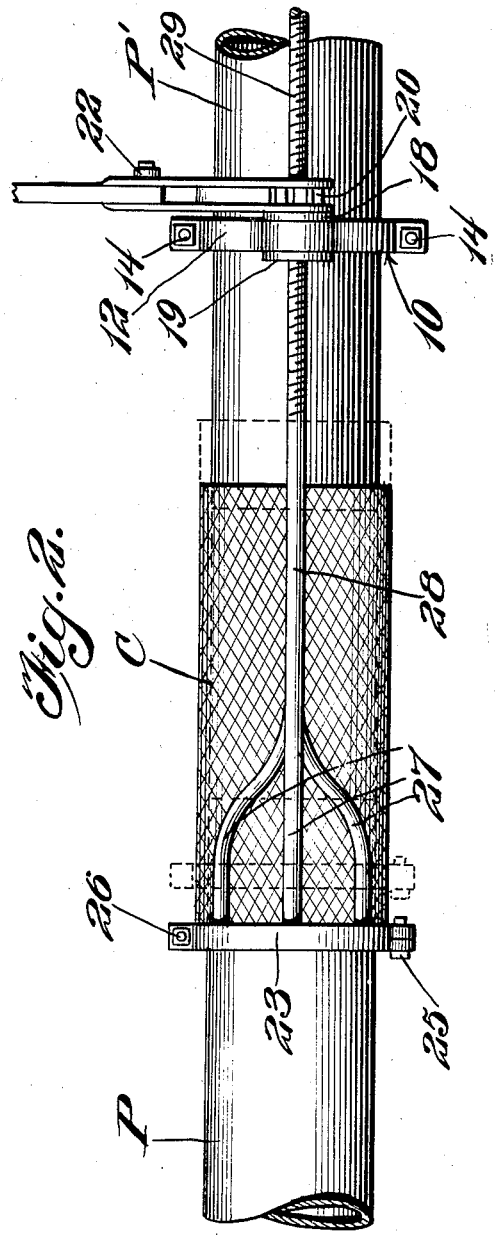
Inventors
Oscar J. Weiss
Arthur J. Brown
By Watson E. Coleman
Attorney

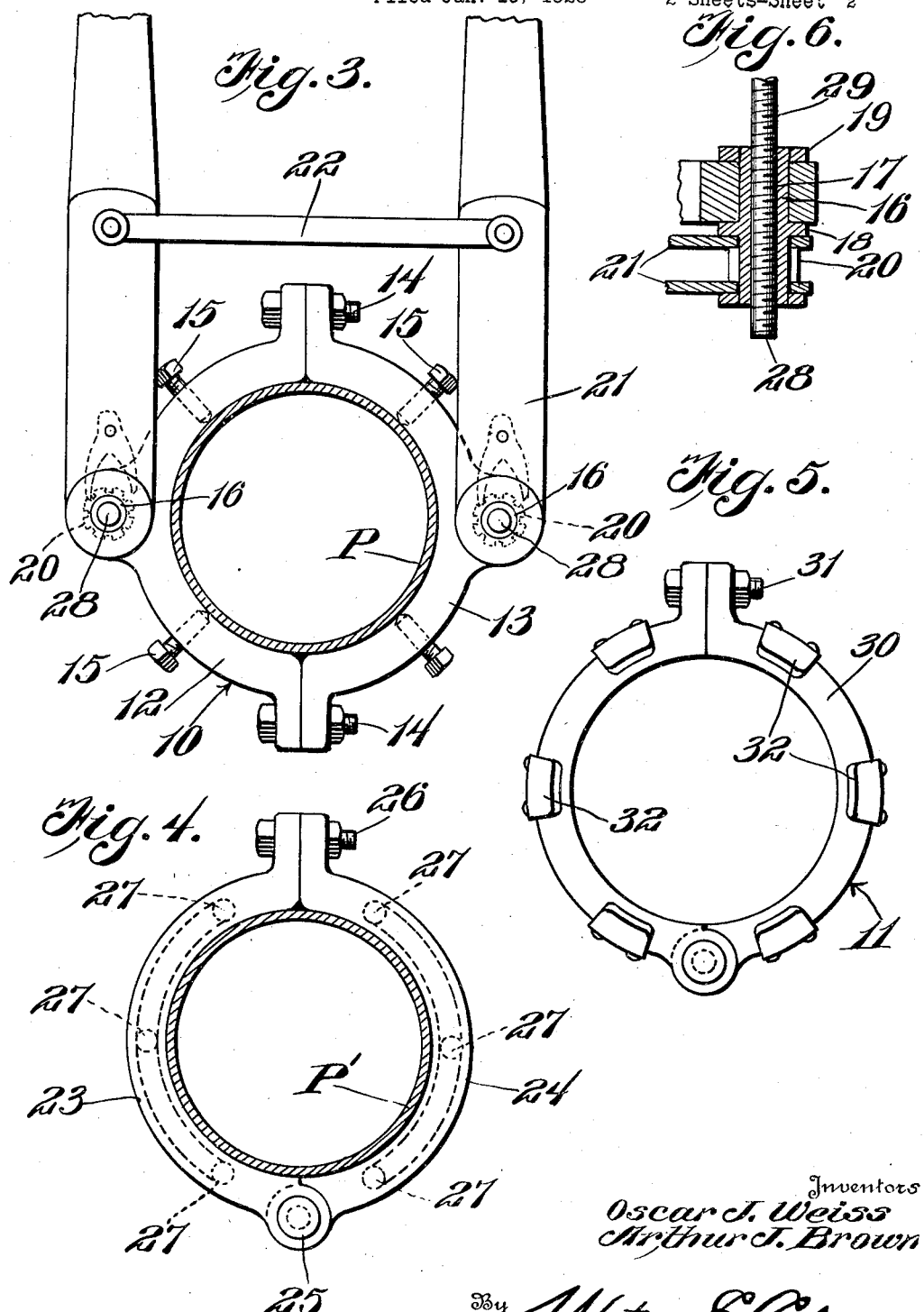

Patented June 8, 1926.

1,587,689

UNITED STATES PATENT OFFICE.

OSCAR J. WEISS AND ARTHUR J. BROWN, OF QUINCY, ILLINOIS.

DEVICE FOR APPLYING FLEXIBLE PIPE CONNECTIONS.

Application filed January 19, 1926. Serial No. 82,381.

This invention relates to devices for applying and removing flexible pipe connections and more particularly to a device for removing the hose connection which is commonly known as bags and employed for connecting adjacent sections of dredge lines so that the pipe line employed may be rendered flexible.

These bags are usually formed of plies of canvas and rubber and the connection is generally made so that it is very slightly smaller than the dredge pipe so that it clings tightly thereagainst to provide a tight seal. This tight seal is necessary for these dredge lines are usually suction lines and any leakage at the joints reduces materially the efficiency of the pump. A slight leak at each joint of a long dredge line would be sufficient to break the suction of the pump and render the same inoperative. The present system of applying these connections is to drive the same into position by employing a mallet or something of a similar order by which repeated blows are struck against the ends of the tubing. This has the tendency to separate the layers of the tubing forming the connection and cause the same to disintegrate rapidly in addition to rendering the insertion of a pipe in the battered end difficult. Devices have been devised for applying pressure to the tubing to apply the same but those devices with which I am familiar each grasp one end of the bag to pull it on to the end of the pipe to which it is to be applied. These grasping devices have a tendency to spread the end of the tubing and thus cause leakage. Accordingly an important object of the invention is to provide a device of this character which will apply the connection without materially distorting the same and which will apply the connection by pressure applied to one end as opposed to the pull opposed to the opposite end thereof.

A still further object of the invention is to provide a device of this character which may be very readily applied to and removed from the dredge pipes, thus enabling its rapid use where a series of connections are to be made.

These and other objects we attain by the construction shown in the accompanying drawings, wherein for the purpose of illustration is shown a preferred embodiment of our invention and wherein:—

Figure 1 is a side elevation showing apparatus constructed in accordance with my invention in position for applying a connection to adjacent pipe ends, the connection being already applied to one end of one pipe and being illustrated in the process of engagement with the second pipe;

Figure 2 is a view showing the device for removing the connection from adjacent pipe ends;

Figure 3 is a section on the line 3—3 of Figure 1;

Figure 4 is a section on the line 4—4 of Figure 1;

Figure 5 is an end view of the guiding element; and

Figure 6 is a sectional view through the ratchet nut mounting.

Referring now more particularly to the drawings, the device includes a pressure applying device, generally indicated at 10, and a guiding device, generally indicated at 11. The pressure applying device comprises a fixed collar formed in two sections 12 and 13 to be clamped about a pipe by bolts 14 or the like and having set screws 15 for engagement with the pipe to assist in holding the collar in position. Each section has directed therethrough an interiorly threaded sleeve 16, these sleeves being rotatably engaged with the sections 12 and 13 and having an interiorly threaded bore 17. The sleeves are held against movement in a direction paralleling the axis of the collar by flanges 18 and 19. The upper ends of the sleeves are formed with a ratchet drum 20 upon their outer surfaces and have associated therewith a ratchet lever 21 of any suitable description. The handles of these levers are connected by a link 22 for simultaneous movement and this link is preferably removably so that at inaccessible points, the levers may be independently operated.

The pressure section also includes a movable collar formed in two sections 23, 24 hinged to one another, as at 25, at one side and the opposite side having a removable securing element 26 permitting opening of the sections to assemble the collar about the pipe. Each section has secured thereto the ends of a plurality of fingers 27 formed upon the end of a bolt 28 which is longitudinally threaded, as at 29, for direction through the sleeve of the ratchet. It will be obvious that by operating these ratchets which are reversible, the movable collar may be caused to move toward or away from the fixed collar. The guiding device 11 comprises a split collar 30 adapted to be assembled about and clamped upon a pipe by the securing elements 31. This collar has projecting longitudinally therefrom at one side a plurality of flat flexible fingers 32, the ends of which converge toward the axis of the collars at their free ends and are arranged upon a circle of less diameter than the connection C which is to be applied.

In the use of the device, where the connection C is to be applied to the adjacent ends of two pipes P and P', the guiding device is first placed upon the end of one of the pipes so that the ends of the guiding fingers 32 project beyond the end of the pipe. The fixed and movable collars are then placed in applied position, the movable collar being engaged against the end of the connection C while the fixed collar is clamped upon the pipe P. As its ratchets engage with the bolts 29 of the movable collar, by operating these ratchets, pressure is applied to the outer end of the connection C and the same caused to slip up on the guiding fingers 32 until it engages over the end of the pipe. The collar 30 may, at this time, be loosened and will move with the connection until the connection is engaged with the pipe P the desired distance which should be approximately twice as great as the distance with which the connection will engage the pipe P when finally applied. The positions of the parts are then reversed, being applied to the pipe P' but the movable collar of the pressure applying device is loosely surrounding the pipe P and abutting the end of the connection C. The device is then employed in the same way to partially withdraw the connection C from the pipe P and at the same time apply it over the pipe P'.

When it is desired to remove a connection, the pressure apparatus is employed alone and after the usual clamps (not herein shown) which secure the connection C to the pipes P, P', have been removed, the pressure device is applied to one of these pipes so that its movable collar engages against the adjacent end of the connection C. Pressure is then applied until the connection C is removed from this pipe after which the device is applied to the other pipe and the operation repeated to remove the connection from the second pipe.

It will be obvious that a device of this character may be readily operated and will apply and remove the connections without damaging the same. It will furthermore be obvious that the structure is capable of a certain range of change and modification without materially departing from the spirit of our invention and we accordingly do not limit ourselves to such specific structure except as hereinafter claimed.

We claim:—

1. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar and a guiding element adapted to be secured to the pipe section to which the connection is to be applied and having a plurality of longitudinally extending figures, the ends of which converge and are arranged upon a radius less than the internal diameter of the connection which is to be applied.

2. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar comprising threaded bars secured to the second collar at circumferentially spaced points, ratchet nuts carried by the first named collar and through which the threaded rods are directed, operating levers for said ratchet nuts and a connection between said operating levers whereby they may be simultaneously operated.

3. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar comprising threaded bars secured to the second collar at circumferentially spaced points, ratchet nuts carried by the first named collar and through which the threaded rods are directed, operating levers for said ratchet nuts, a connection between said operating levers whereby they may be simultaneously operated, and a guiding element adapted to be secured to the pipe section to which the connection is to be applied and having a plurality of longitudinally extending fingers, the ends of which converge and are arranged upon a radius less than the internal diameter of the connection which is to be applied.

4. An apparatus for applying and removing the sleeve connections between the adjacent ends of pipes comprising a collar adapted to be clamped upon one pipe section, second collar adapted to loosely engage about a second pipe section, a connection between said collars whereby the second collar may be shifted toward or away from the first named collar and a guiding element adapted to be secured to the pipe section to which the connection is to be applied and having a plurality of longitudinally extending fingers, the ends of which converge and are arranged upon a radius less than the internal diameter of the connection which is to be applied, the guiding element including a pair of sections hingedly connected at one end and having means at the opposite end whereby the sections may be clamped about a pipe, said fingers being secured to said sections.

5. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar and a guiding element adapted to be secured to the pipe section to which the connection is to be applied and having a plurality of longitudinally extending fingers, the ends of which converge and are arranged upon a radius less than the internal diameter of the connection which is to be applied, each of said collars being formed in sections adapted to be clamped about a pipe section with which it is associated.

6. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar and means adapted to be connected to one of the pipe sections for guiding the sleeve into position upon the pipe.

7. An apparatus for applying and removing the sleeve connections between the adjacent ends of pipes comprising a collar adapted to be clamped upon one pipe section, a second collar adapted to loosely engage about a second pipe section, a connection between said collars whereby the second collar may be shifted toward or away from the first named collar comprising threaded bars secured to the second collar at circumferentially spaced points, ratchet nuts carried by the first named collar and through which the threaded rods are directed, operating levers for said ratchet nuts, a connection between said operating levers whereby they may be simultaneously operated and means attachable to the first named pipe section for guiding the sleeve into position upon the section.

In testimony whereof we hereunto affix our signatures.

OSCAR J. WEISS.
ARTHUR J. BROWN.